(12) United States Patent
Gibson et al.

(10) Patent No.: US 11,665,034 B1
(45) Date of Patent: May 30, 2023

(54) RADIO FREQUENCY (RF) RECEIVER THAT DETERMINES AN INTERFERING PHASE SHIFT KEYING (PSK) SIGNAL AND ASSOCIATED METHODS

(71) Applicant: L3HARRIS TECHNOLOGIES, INC., Melbourne, FL (US)

(72) Inventors: L. Andrew Gibson, Riverton, UT (US); Alexander Kimani, Grantsville, UT (US); Lance R. Lindsay, Woodscross, UT (US); Christian Schlegel, Park City, UT (US); Christopher L. Brown, Sandy, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 7 days.

(21) Appl. No.: 17/456,897

(22) Filed: Nov. 30, 2021

(51) Int. Cl.
*H04L 27/227* (2006.01)
*H04B 1/10* (2006.01)

(52) U.S. Cl.
CPC ........... *H04L 27/2273* (2013.01); *H04B 1/10* (2013.01)

(58) Field of Classification Search
CPC .... H04L 27/2273; H04L 27/0008; H04B 1/10
USPC ....................................................... 375/346
See application file for complete search history.

(56) References Cited

U.S. PATENT DOCUMENTS

| 6,804,309 | B1 | 10/2004 | Morelos-Zaragoza | |
| 6,993,096 | B1 * | 1/2006 | Shiraishi | H04N 5/455 375/279 |
| 9,794,092 | B1 | 10/2017 | Isautier et al. | |

OTHER PUBLICATIONS

Feng et al., "An Accurate Modulation Recognition Method of QPSK Signal," Mathematical Problems in Engineering; vol. 2015; Article ID 516081; May 2015; pp. 1-7.
Hazza et al., "An Overview of Feature-Based Methods for Digital Modulation Classification," IEEE Conference Paper; 1st International Conference on Communications, Signal Processing, and their Applications (ICCSPA); Feb. 2013; pp. 1-7.
Ramkumar, "Automatic Modulation Classification for Cognitive Radios Using Cyclic Feature Detection," IEEE Circuits and Systems Magazine; Second Quarter 2009; pp. 27-45.

* cited by examiner

*Primary Examiner* — Leila Malek
(74) *Attorney, Agent, or Firm* — Allen, Dyer, Doppelt + Gilchrist, P.A.

(57) ABSTRACT

A Radio Frequency (RF) receiver may include a lower-order phase shift keying (PSK) demodulation circuit configured to generate at least one locking parameter when performing a lower-order PSK demodulation of an RF receive signal having an interfering PSK signal component. A higher-order PSK demodulation circuit has a higher order than the lower-order PSK demodulation circuit, and locks to the RF receive signal using the at least one locking parameter from the lower-order PSK demodulation circuit. The higher-order PSK demodulation circuit performs the higher-order PSK demodulation of the RF receive signal based upon locking to the RF receive signal to determine the interfering PSK signal component.

23 Claims, 15 Drawing Sheets

8PSK SIGNAL IS SAMPLED (*) WITH QPSK LOCK

SAMPLES OPTIMIZED BY TIMING
CIRCUIT WITH "QPSK" LOCK $x^8$ ESTIMATED IMPROVED BY QPSK LOCK FOR Fc AND Rs ESTIMATION

RATE LINES ARE CLEARLY IDENTIFIED
THE ESTIMATION IMPROVED OF Fc AND Rs IS IMPROVED

US 11,665,034 B1

RADIO FREQUENCY (RF) RECEIVER THAT DETERMINES AN INTERFERING PHASE SHIFT KEYING (PSK) SIGNAL AND ASSOCIATED METHODS

FIELD OF THE INVENTION

The present invention relates to the field of Radio Frequency (RF) receivers, and, more particularly, to RF receivers having Phase Shift Keying (PSK) demodulator circuits that determine an interfering PSK signal component, and related methods.

BACKGROUND OF THE INVENTION

Many communication receivers require a secure communications channel to receive the RF signal, identify its modulation format and demodulate the RF signal. These RF receivers often incorporate an advanced interference excision circuit that automatically identifies and mitigates both intentional and unintentional interfering signal components, such as static tones, dynamic frequency tones, and modulated RF signals.

For example, it is possible by mistake for a party to broadcast interfering RF signals in the same frequency band that is occupied by other users, which may cause unintentional interference. Others may broadcast in that same frequency band to create intentional interference in an RF receiver to which a transmitted RF communications signal is intended. It often takes an extended time period for the intended recipient to determine who is sending the interfering signal and remove that interfering signal at the RF receiver. Usually the RF receiver incorporates a complex demodulator and remodulator circuit or a narrow band excision circuit, which may operate well with lower-order modulated RF signals, but often do not operate adequately when operating with higher-order RF signals.

A lower-order modulated RF signal, such as a quadrature phase shift key (QPSK) or binary phase shift key (BPSK) modulated signal, includes a low error rate, anti-jamming capability and low complexity, and thus, may be more readily processed at many RF receivers to determine and remove any lower-order interfering RF signal. For that reason, lower-order modulated RF signals are commonly used in intra-satellite communications, GPS navigation systems, and common communication data links. These lower-order modulated RF signals may be processed in more conventional lower-order demodulation circuits that quickly identify the lower-order modulated communication signals and determine the carrier frequency (Fc) and symbol rate (Fs) of any interfering, lower-order RF signal component.

Traditional circuits, such as delay and multiply circuits, may determine the symbol rate and the carrier frequency of lower-order interfering RF signals and may be supplemented by neural networks to determine the signal type. Traditional interference excision systems may remove the determined, interfering lower-order RF signal components. However, these traditional approaches that identify critical characteristics of interfering lower-order signals may not work for higher-order modulation schemes, for example, 8-PSK RF signals, because of the intermodulation and multiplication of the signal and noise, which causes the noise floor to grow. As a result, it may be more difficult to discern the rate lines that are used to determine the center carrier frequency and symbol rate. This difficulty occurs with most other higher-order modulation schemes.

SUMMARY OF THE INVENTION

In general, a Radio Frequency (RF) receiver may include a lower-order phase shift keying (PSK) demodulation circuit configured to generate at least one locking parameter when performing a lower-order PSK demodulation of an RF receive signal that includes an interfering PSK signal component. A higher-order PSK demodulation circuit may have a higher order than the lower-order PSK demodulation circuit, and may be configured to lock to the RF receive signal using the at least one locking parameter from the lower-order PSK demodulation circuit. The higher-order PSK modulation circuit may perform the higher-order PSK demodulation of the RF receive signal based upon locking to the RF receive signal to determine the interfering PSK signal component.

The RF receiver may include an interference removal circuit configured to remove the determined interfering PSK signal component from the RF receive signal. The lower-order PSK demodulation circuit may comprise a demodulator and a remodulator coupled thereto. The demodulator may comprise a first phase shifter, a detector coupled downstream from the first phase shifter, and a phase loop coupled between the detector and first phase shifter. The remodulator may comprise a second phase shifter, and a controller coupled thereto.

The at least one locking parameter may comprise a carrier frequency of the RF receive signal, and in another example, may comprise a symbol rate of the RF receive signal, or both. The lower-order PSK demodulation circuit may comprise one of a BPSK and QPSK demodulation circuit, for example. The higher-order PSK demodulation circuit may comprise one of an 8 PSK, 16 PSK, and 16 QAM demodulation circuit.

Another aspect is directed to a method for Radio Frequency (RF) reception that may comprise operating a lower-order phase shift keying (PSK) demodulation circuit to generate at least one locking parameter when performing a lower-order PSK demodulation of an RF receive signal that includes an interfering PSK signal component. The method may further include operating a higher-order PSK demodulation circuit, which has a higher order than the lower-order PSK demodulation circuit, to lock to the RF receive signal using the at least one locking parameter from the lower-order PSK demodulation circuit, and perform the higher-order PSK demodulation of the RF receive signal based upon locking to the RF receive signal to determine the interfering PSK signal component.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
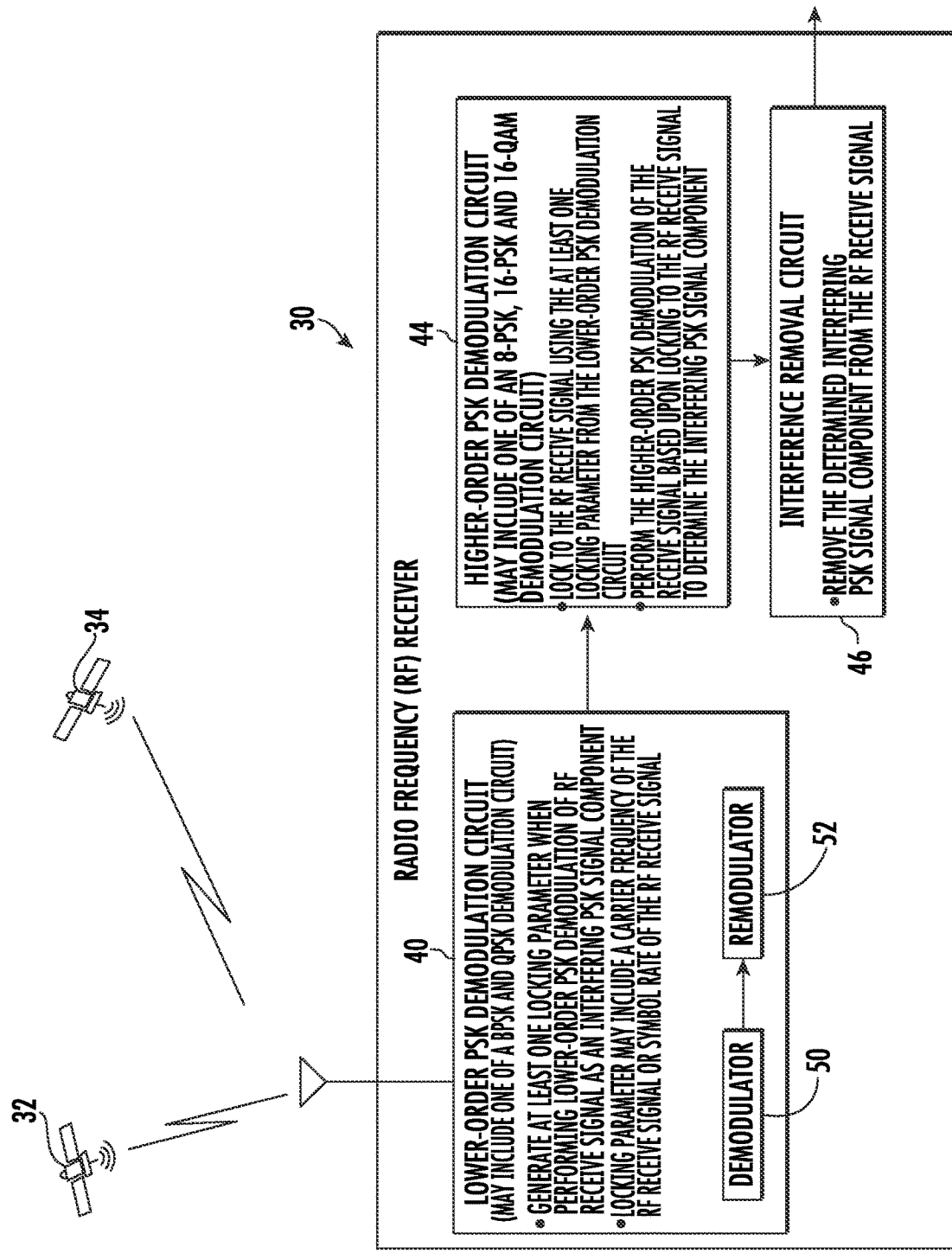
FIG. 1 is a block diagram of a radio frequency (RF) receiver that determines an interfering phase shift keying (PSK) signal component in accordance with a non-limiting example.

Referring initially to FIG. 1, a radio frequency (RF) receiver is illustrated generally at 30 and receives, for example, an RF signal such as a higher-order modulated communications signal from a first satellite 32. Examples of this higher-order modulated communications signal include an 8-PSK (phase shift keyed), 16-PSK, or 16-QAM (quadrature amplitude modulated), 64 QAM, 128 QAM, 256 QAM, and other higher order modulated signals. The RF receiver 30 may receive an interfering signal from another source such as the illustrated second satellite 34 or other sources of RF transmission on the ground or in the air. In an example, two or more transmitters may be on the ground, which transmits the signals to the satellite 32, which retransmits the jammed signal. This interfering signal is to be determined and removed. The RF receiver 30 includes a lower-order phase shift keying (PSK) demodulation circuit 40 that is configured to generate at least one locking parameter when performing a lower-order PSK demodulation of the RF receive signal, which includes the interfering PSK signal component transmitted in this example from the second satellite 34.

A higher-order PSK demodulation circuit 44 is coupled to the lower-order PSK demodulation circuit 40 and has a higher order than the lower-order PSK demodulation circuit and is configured to lock to the RF receive signal using the at least one locking parameter from the lower-order PSK demodulation circuit. This higher-order PSK demodulation circuit 44 performs the higher-order PSK demodulation of the RF receive signal based upon locking to the RF receive signal to determine the interfering PSK signal component. An interference removal circuit 46 is configured to remove the determined interfering PSK signal component from the RF receive signal and may be operatively coupled to the higher-order PSK demodulation circuit 44 as a separate circuit or integrated therewith as part of that circuit.

In an example, the at least one locking parameter may be a carrier frequency of the RF receive signal, and in another example, the at least one locking parameter may be a symbol rate of the RF receive signal, or both. The lower-order PSK demodulation circuit 40 may be formed by one of a binary phase shift keying (BPSK) and quadrature phase shift keying (QPSK) demodulation circuit. On the other hand, the higher-order PSK demodulation circuit 44 may include one of an 8-PSK, 16-PSK, and 16-QAM (quadrature amplitude modulation), 64 QAM, 128 QAM, 256 QAM, or higher order demodulation circuit. An example RF receiver 30 may be incorporated with the Gatekeeper™ advanced interference excision system as manufactured by L3Harris Technologies, Inc.

The RF receiver 30 identifies and mitigates both intentional and unintentional interfering signals to restore performance of a host system. The RF receiver 30 may mitigate and remove interference caused by intentional or unintentional static tones, dynamic frequency tones, and similar modulated signals.

Figure 2:
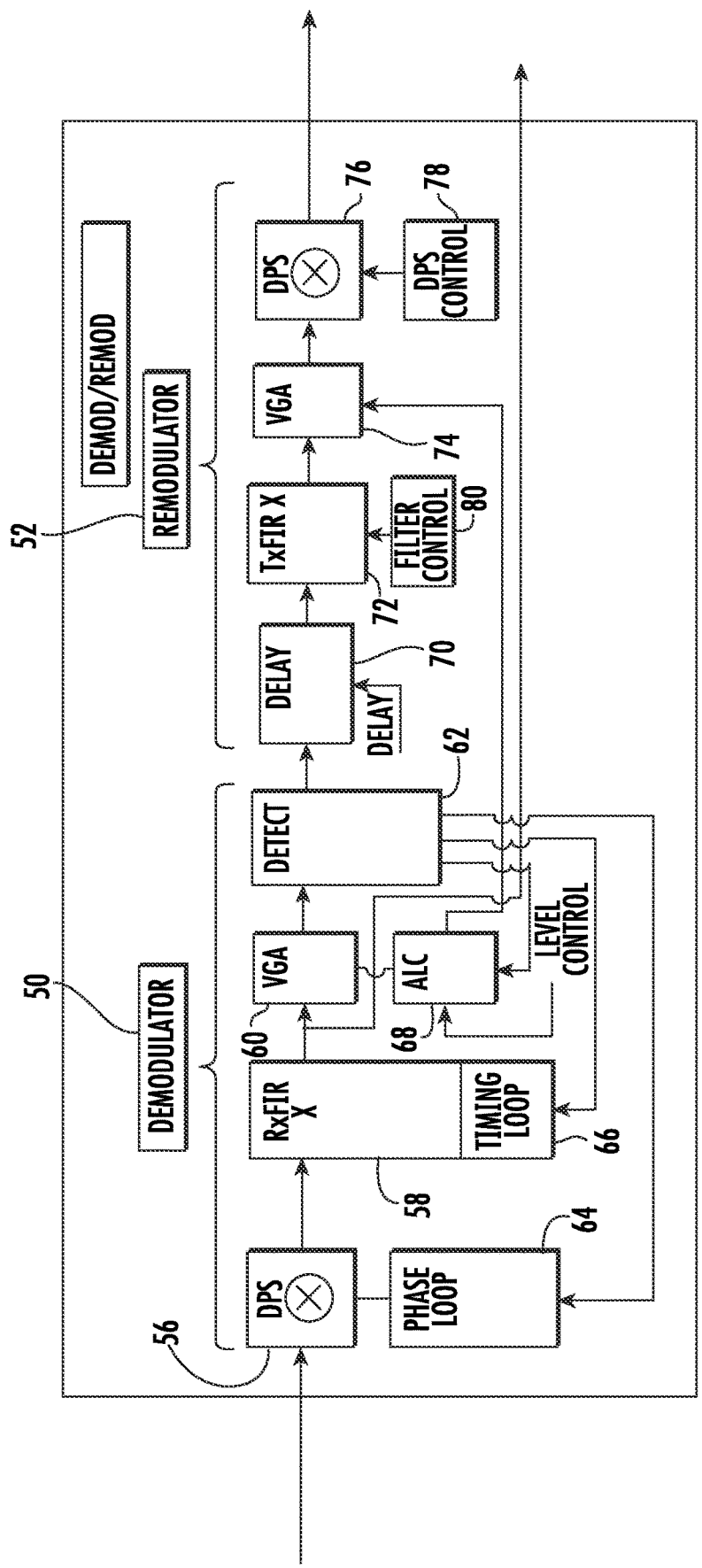
FIG. 2 is a block diagram of the demodulator and remodulator for the lower-order PSK demodulation circuit in the RF receiver of FIG. 1.

The lower-order PSK demodulation circuit 40 includes a demodulator 50 and a remodulator 52 coupled thereto, which are illustrated in greater detail in FIG. 2, showing further components in block diagram of the demodulator and remodulator. The demodulator 50 and remodulator 52 operate as part of the lower-order PSK demodulation circuit 40 and together generate at least one locking parameter to lock onto a subset of a higher-order signal constellation such as an 8 PSK modulated RF signal. The demodulator 50 receives the RF receive signal as converted to a digital signal having the interfering PSK signal component into a first digital phase shifter 56 that operates as a mixer and rotates the I and Q components of the RF receive signal and shifts phase of the signal. The rotated, i.e., phase shifted signal, is received within a receive finite impulse response (FIR) filter 58, and after filtering at the FIR filter, the signal is received into a variable gain attenuator (VGA) 60 followed by signal detection within a detector circuit 62 coupled downstream from the first digital phase shifter 56 as illustrated.

A phase loop 64 is coupled between the detector circuit 62 and first digital phase shifter 56 and operates to replicate and track frequency and phase when in lock. A timing loop 66 is coupled between the detector circuit 62 and receive finite impulse response filter 58 and aids in keeping time to allow the filter to settle to zero in finite time. An automatic level control (ALC) circuit 68 is coupled between the detector 62 and VGA 60 to help maintain the gain and control VGA operation. As noted before, the digital phase shifter 56 rotates the data by rotating the I and Q signal components respectively.

The remodulator circuit 52 receives the demodulated signal from the detector circuit 62 and delays that signal via a delay circuit 70 and passes the delayed signal into a transmit finite impulse response filter 72 to filter the signal and attenuate it at a variable gain attenuator 74. A second digital phase shifter 76 shifts the I and Q signal components and is controlled via a digital phase shifter controller 78 connected thereto to impart the requisite rotation to aid in locking to a signal. The transmit finite impulse response (FIR) filter 72 receives a filter control signal 80 such as generated from the controller 78. The delay circuit 70 also receives a delay signal to control the time, phase and amount of delay, which may be matched with other delays in a serial architecture of a plurality of serially connected demodulator 50 and remodulator 52 circuits, such as arranged in the circuit of FIG. 3. Once signals are locked in time, the interfering signals can be subtracted and removed.

Figure 3:
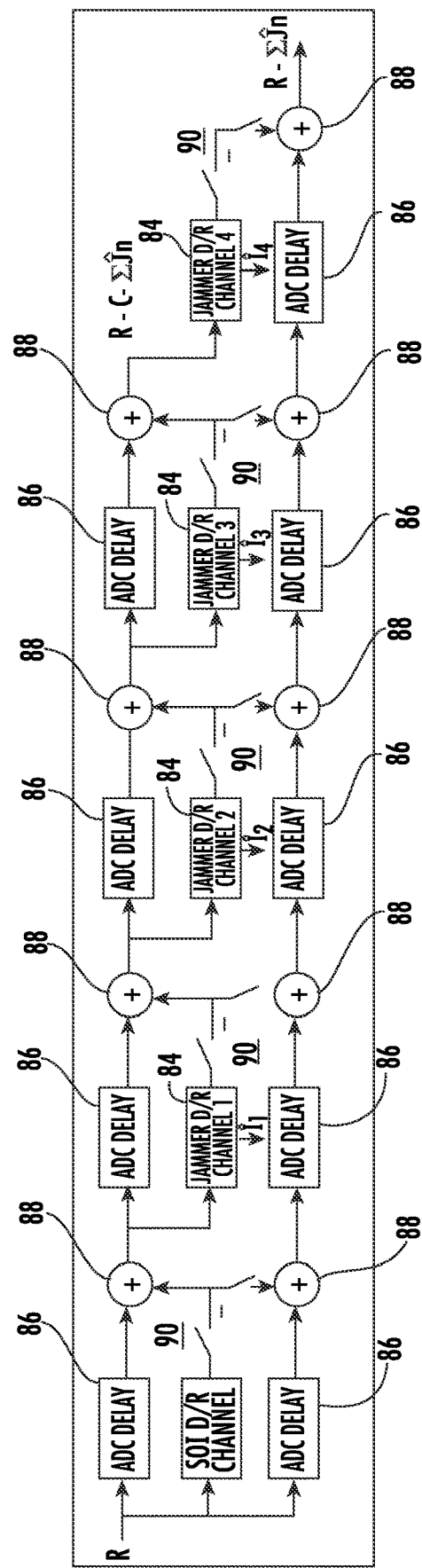
FIG. 3 is a block diagram of a section of the lower-order PSK demodulation circuit having multiple demodulator and remodulator circuits to determine multiple interfering PSK signal components.
Figure 4:
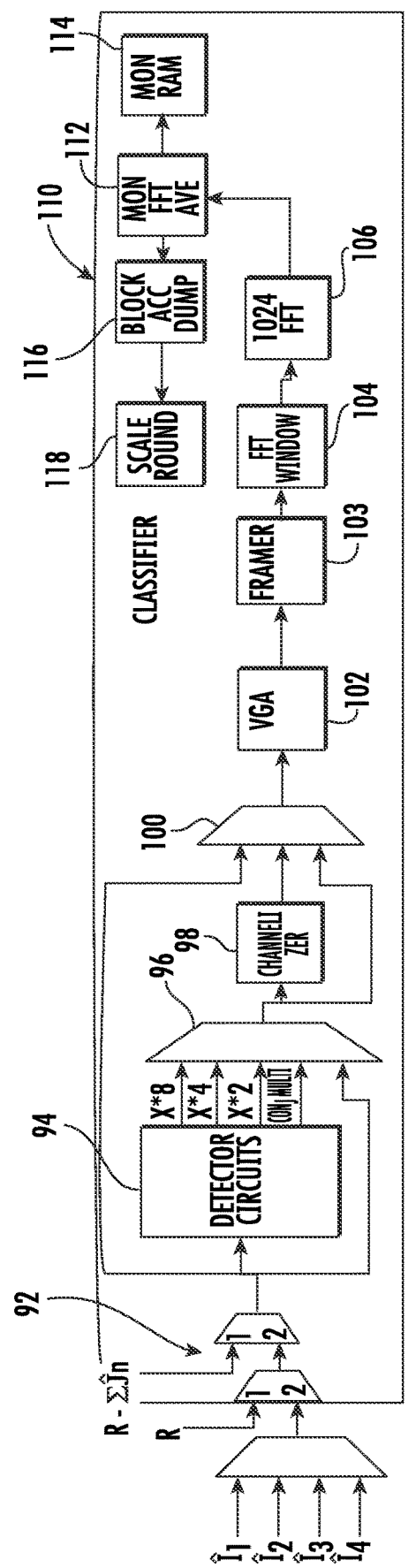
FIG. 4 is a block diagram of a section of the higher-order PSK demodulation circuit that locks to the RF receive signal and determines interfering PSK signal components.

As shown in FIG. 3, multiple, serially connected demodulator 50 and remodulator 52 circuits, which together are indicated generally at 84, are connected in a serial configuration to each other to process multiple RF signal jammers. The signals of interest are received within a plurality of serially connected analog-to-digital converter delays 86 and summers 88 having two parallel paths as illustrated and switch mechanisms 90 for the respective demodulator/remodulator circuits 84 that each output into the summers as part of the lower-order PSK demodulation circuit 90. The delays 86 may be matched to each other and initial sampling is usually at around Nyquist or just below.

The different locking parameters $I_1$, $I_2$, $I_3$, $I_4$ are output from each of the demodulator 50 and remodulator 52 circuits, each shown generally at 84, and are passed into a series of input multiplexers 92 that also receive a digital conversion of the RF signal (R) and an inverted, interfering signal ($R-\Sigma J_n$), which are combined together and received into the classifier detector circuit 94, processed, and output into a first output multiplexer 96 and channelizer 98 as a filter, and through the second output multiplexer 100. Although the RF receiver 30 is described as processing 4 jammers, the RF receiver is scalable and may handle a fewer or larger number of jammers. The combined signal is processed at a variable gain attenuator (VGA) 102 to adjust amplitude. The output data from the VGA 102 is framed 103 and passed through a Fast Fourier Transform window circuit 104 as a data bandpass and processed at a 1024 bit FFT circuit 106.

At this point, the rate line spikes are obtained and those bins are processed and compared to obtain the center carrier frequency and symbol rate using the serial processing circuit illustrated generally at 110 that helps classify the signal, and having a FFT averaging circuit 112, a queue as RAM 114, block dump 116, and circuit for scaling, rounding and classification 118.

Thus, the demodulator 50 and serially connected remodulator 52 operate as part of the lower-order PSK demodulation circuit 40, which initially receives data that is not locked in timing or phase, and locks it to be tracked and remodulated again so that it is lined up in time. It is then received within the higher-order PSK demodulation circuit 44 and locked onto the jammer or interfering PSK signal component, which is determined and subtracted out via the interference removal circuit 46.

Figure 5:
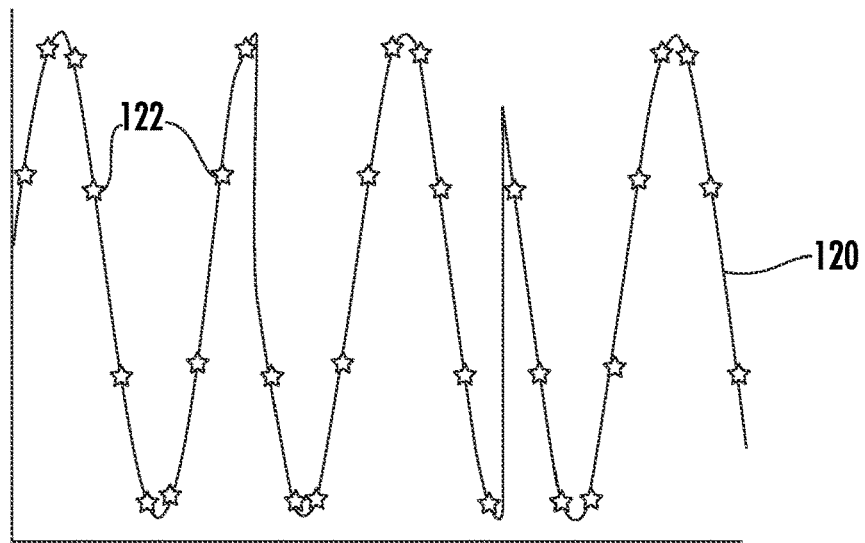
FIG. 5 is a graph of an example 8-PSK signal that is sampled randomly without locking onto a QPSK sub-constellation.

Referring now to FIGS. 5-8, there are illustrated graphs that compare and show how the 8-PSK (phase shift keying) center frequency (Fc) and symbol rate (Rs) may be estimated in their value by locking onto the signal with a sub-constellation of QPSK parameters. FIG. 5 is a graph that illustrates when a received 8-PSK RF waveform 120 is sampled randomly and the sampling points (shown as stars 122) are used to calculate rate lines without locking with the QPSK or other sub-constellation using the RF receiver 30 of FIG. 1. The rate lines are used to determine the center frequency and the symbol rate estimation.

Figure 6:
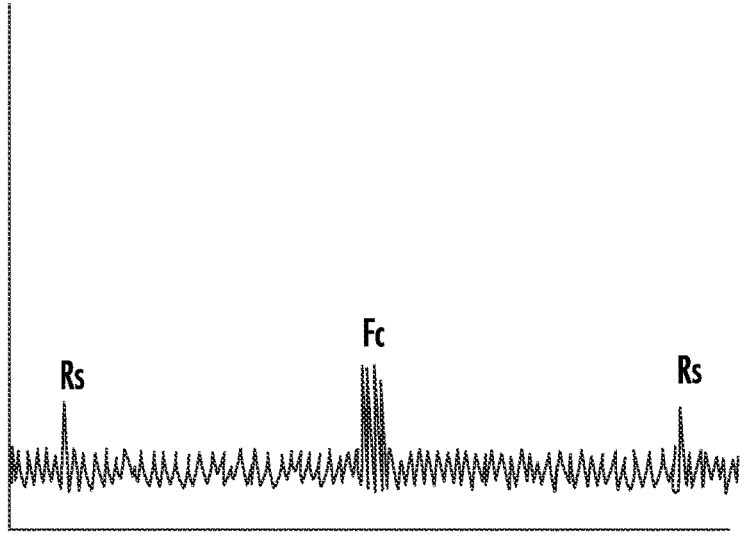
FIG. 6 is a graph showing that rate lines are not well defined to estimate the center frequency and symbol rate when a QPSK sub-constellation is not locked as shown in the graph of FIG. 5.
Figure 7:
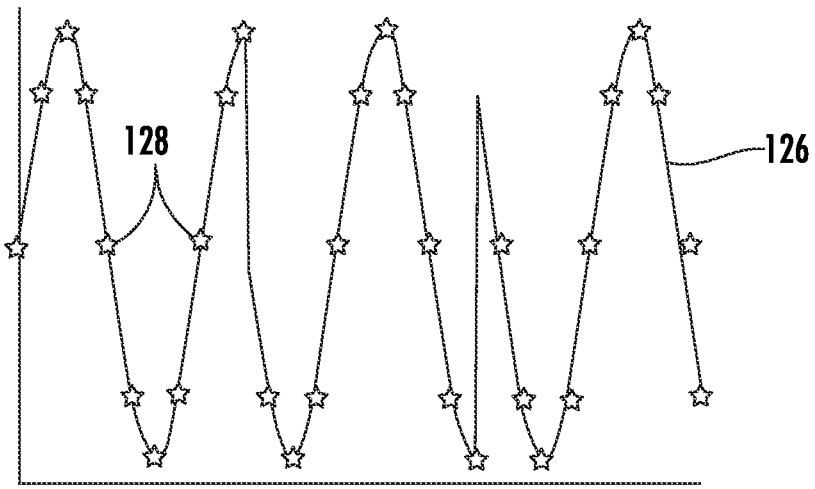
FIG. 7 is a graph similar to that shown in FIG. 5, but showing an 8-PSK signal that is sampled when a QPSK sub-constellation is locked using the RF receiver of FIG. 1.
Figure 8:
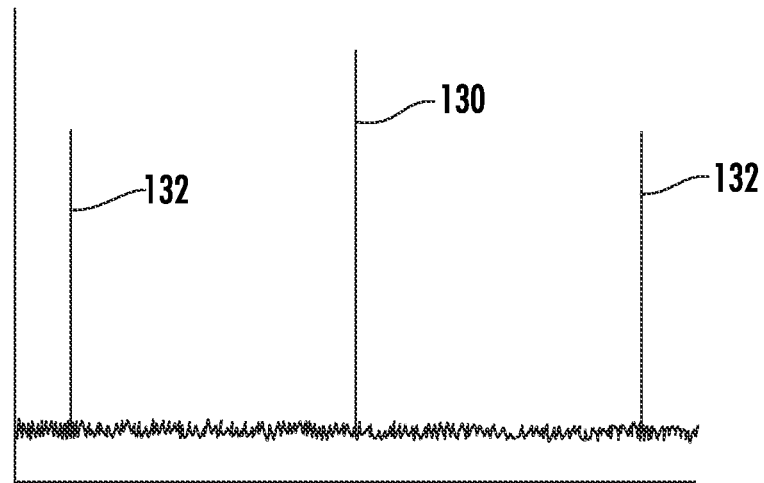
FIG. 8 is a graph showing how the rate lines are clearly identified for the 8-PSK signal to determine the center frequency and symbol rate when the QPSK sub-constellation is locked using the RF receiver of FIG. 1.
Figure 9:
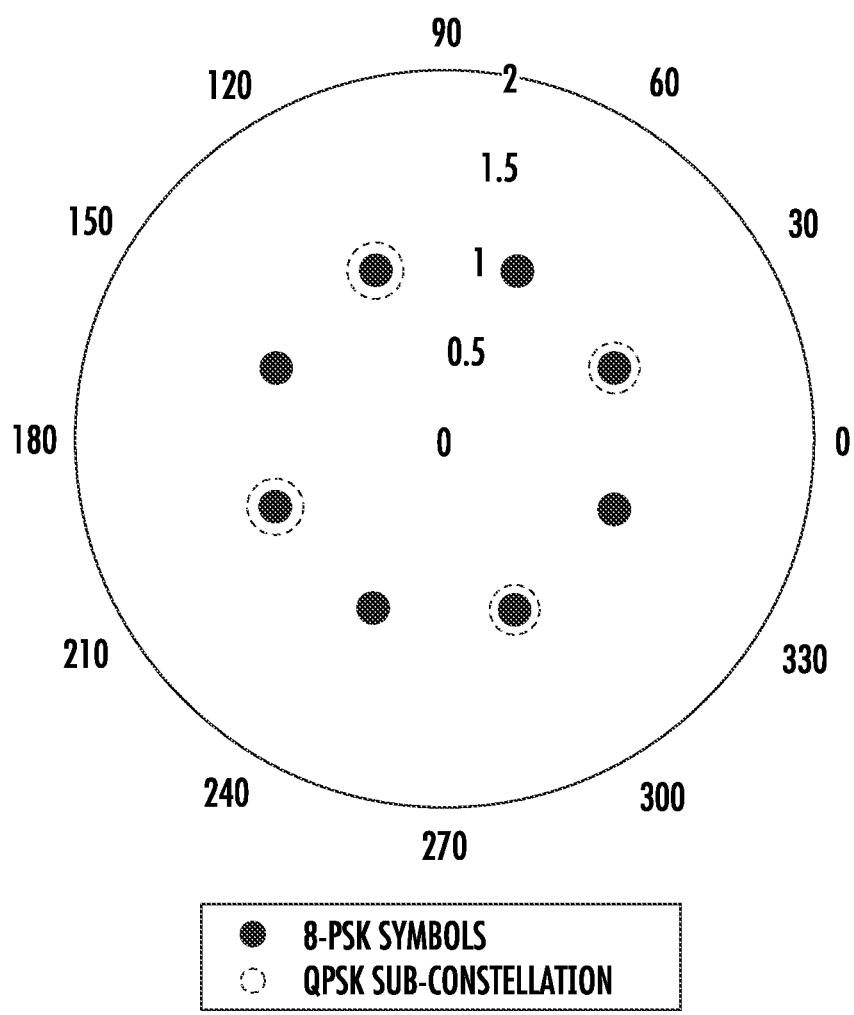
FIG. 9 is a graph showing an 8-PSK signal constellation with a QPSK sub-constellation to generate a locking parameter.

FIG. 6 shows on its graph that the rate lines, which are determined without locking onto the QPSK sub-constellation are not well defined and are difficult to separate from each other and from the noise floor. When the 8-PSK signal shown at 126 is sampled 128 with the QPSK lock (FIG. 7), on the other hand, using the RF receiver 30 of FIG. 1, the lower-order PSK demodulation circuit 40 generates the at least one locking parameter, and the rate lines for the center frequency (Fc) 130 and symbol rate (Rs) 132 are well-defined as shown in the graph of FIG. 8. These well-defined rate lines in the graph of FIG. 8 may be compared to the low quality estimate for Fc and Rs in the graph of FIG. 6, which impacts the ability to lock onto the 8-PSK signal. When using the lower-order PSK demodulation circuit 40 to generate the at least one locking parameter and incorporate it for use by the higher-order PSK demodulation circuit 44, the QPSK parameters initiate the lock and transition to the 8-PSK modulation.

As shown in the graph of FIG. 8, the QPSK parameters allow initial estimates to be a higher quality based on clear and identifiable rate lines. The center frequency corresponding to the carrier frequency is shown by the center vertical line 130, and the symbol rates are shown by the side vertical lines 132, indicative of the better locking onto the 8-PSK signal when the RF receiver 30 of FIG. 1 is employed.

Referring now to FIGS. 9-16, there are illustrated graphs of different higher-order signal constellations and showing the lower-order sub-constellations that may be used to lock as the subset for the sub-constellation and obtain timing lock and determine the well-defined rate lines or peaks as shown in the graph of FIG. 8. The different, higher-order symbols are shown as solid circles in all of the graphs of FIGS. 9-16, while the sub-constellations are shown by the larger circles that generally surround the solid circles, except in the graph of FIG. 13 as explained below. For example, in the graph of FIG. 9, the 8-PSK symbols are shown by the solid circles. Four QPSK sub-constellations as circles completely encircle four of the solid 8-PSK symbols, which indicates the locking onto the subset of the QPSK sub-constellation and the timing alignment of the symbols.

Figure 10:
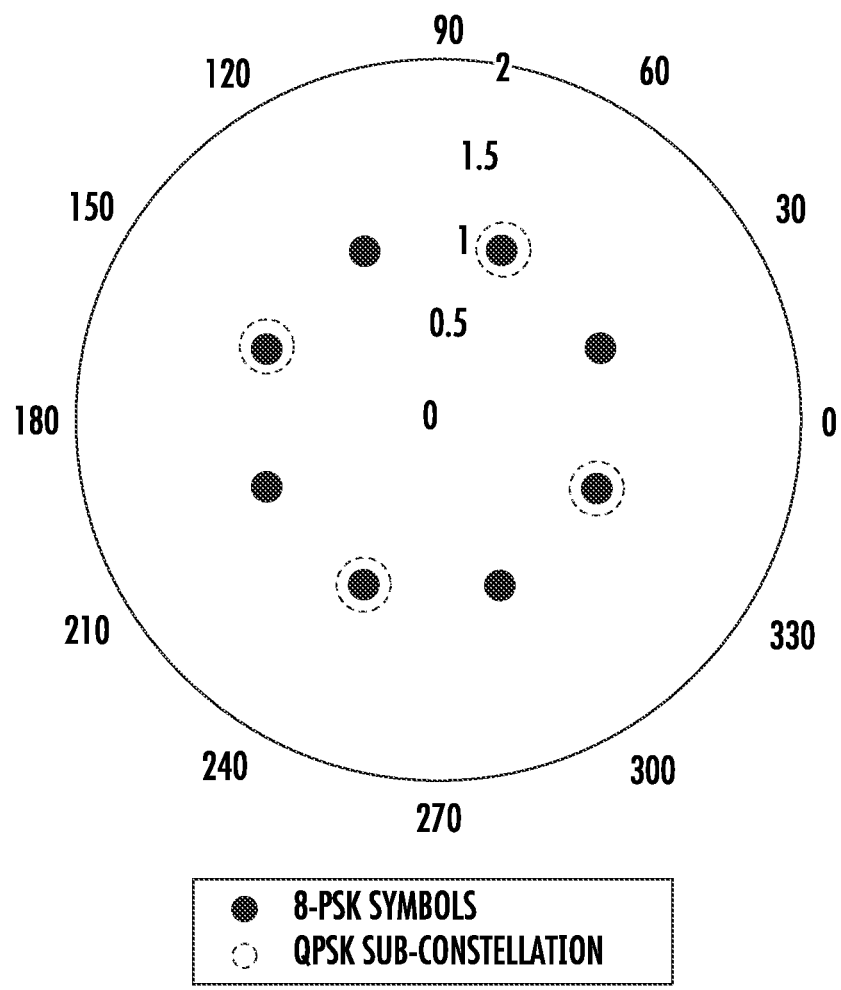
FIG. 10 is a graph showing an 8-PSK signal constellation with an alternate QPSK sub-constellation to generate a locking parameter.
Figure 11:
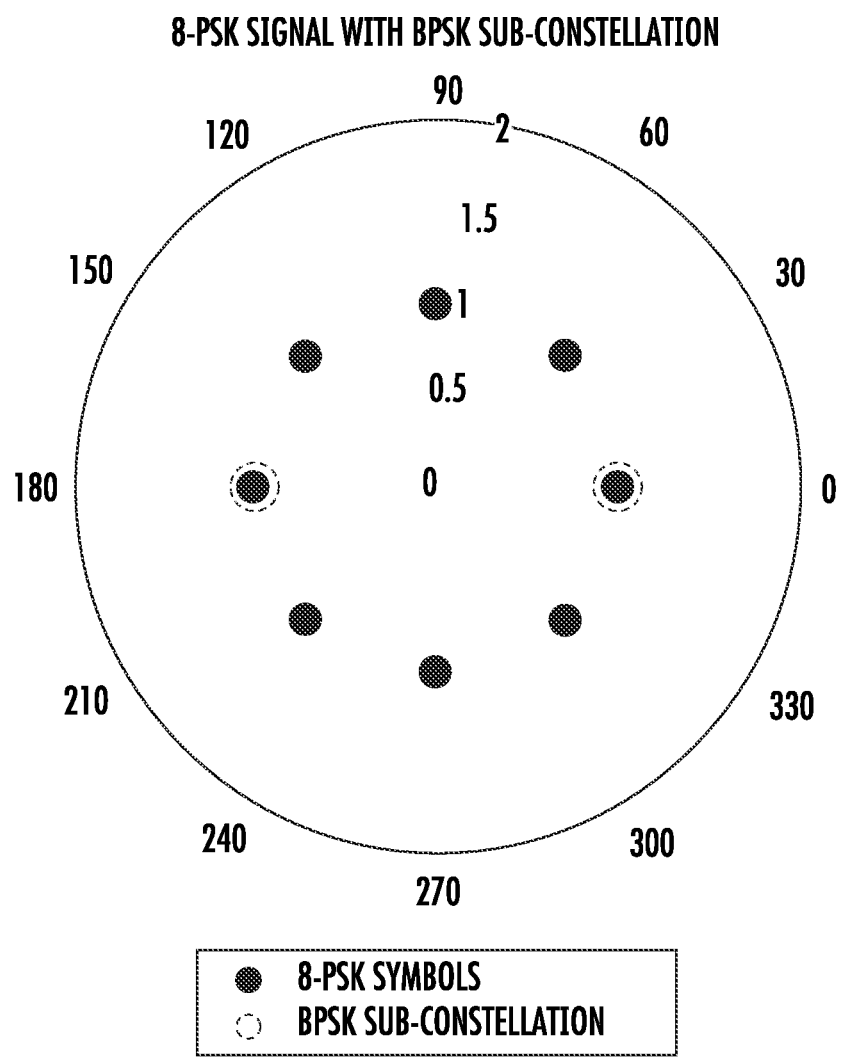
FIG. 11 is a graph showing an 8-PSK signal constellation with a BPSK sub-constellation to generate a locking parameter.

The QPSK sub-constellations are shown by the circles at about the 30°, 300°, 210°, and 120° positions, while the alternate PSK sub-constellation of FIG. 10 shows the QPSK sub-constellations at about the 60°, 330°, 240°, and 150° positions, respectively. Binary phase shift keying (BPSK) sub-constellations are indicated by the circles in FIG. 11, and shown relative to the 8-PSK signal as solid circles. Only two BPSK sub-constellation circles are shown indicative of the binary phase shift keying as a binary sub-constellation. This graph may be compared to the four open circles of the quadrature sub-constellation of FIGS. 9 and 10.

Figure 12:
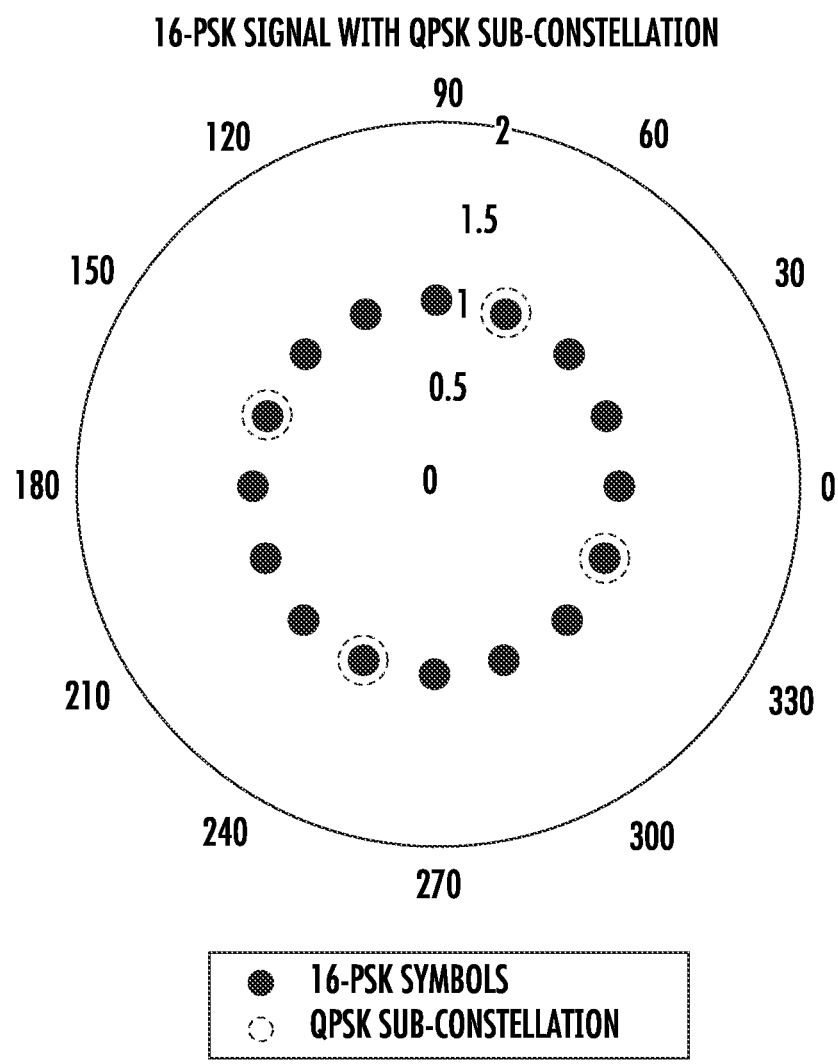
FIG. 12 is a graph showing a 16-PSK signal constellation with a QPSK sub-constellation to generate a locking parameter.
Figure 13:
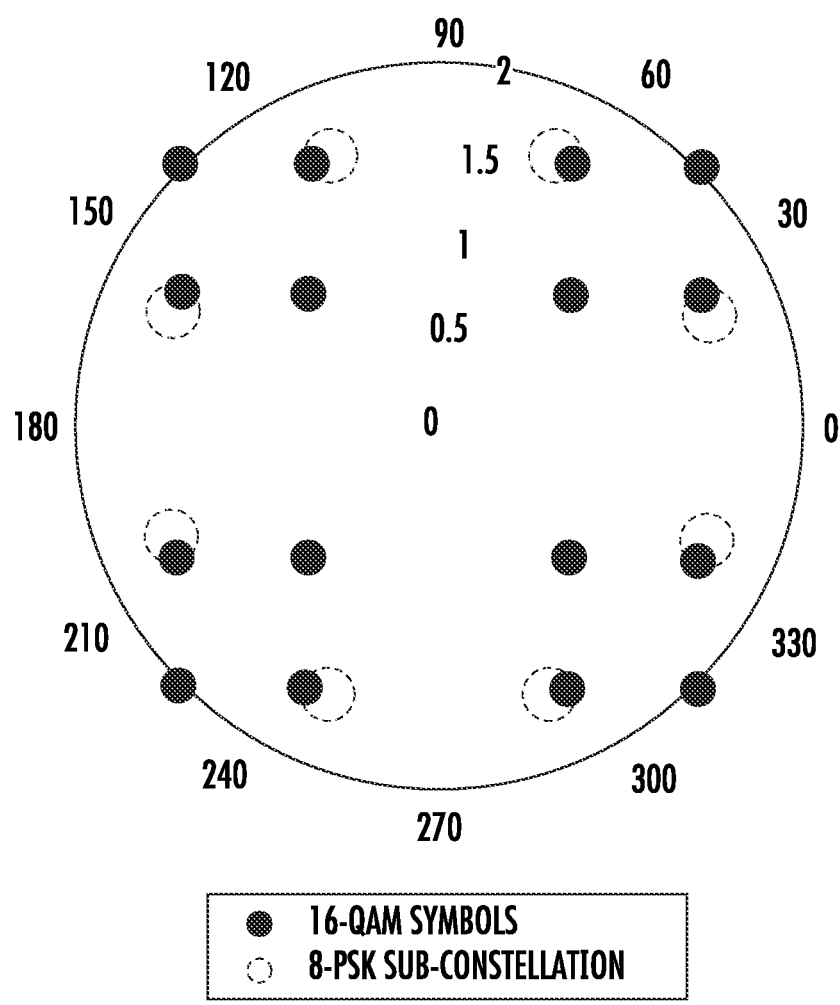
FIG. 13 is a graph showing a 16-QAM signal constellation with an 8-PSK sub-constellation and showing the poor lock and timing resulting from using the higher-order sub-constellation where the sub-constellation circles do not align with the 16-QAM symbols.

FIG. 12 illustrates a graph of a 16-PSK signal, showing the 16-PSK symbols as solid circles with the QPSK sub-constellations at about the 0°, 330°, 240°, and 150° positions. An example of a 16-QAM (quadrature amplitude modulation) signal with an 8-PSK sub-constellation is shown in the graph of FIG. 13 and illustrates how the RF receiver 30 may not stay locked because the 8-PSK sub-constellation circles do not circle completely the 16-QAM symbols, indicating any locking is sporadic or short in duration, and thus, the estimated center frequency and symbol rate results may be similar to the poor results shown in the graph of FIG. 6, where rate lines for the center frequency and symbol rate are near noise floor and not well identified. In many cases, rates are so bad that they are below the noise floor and not seen.

Figure 14:
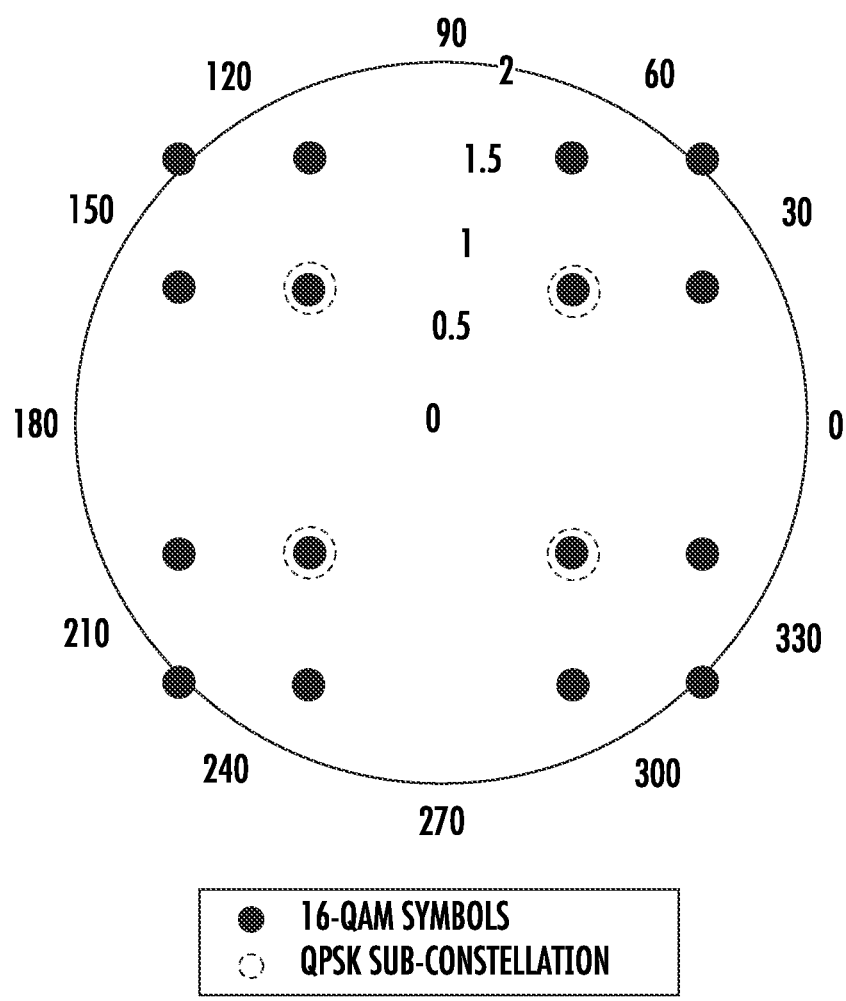
FIG. 14 is a graph showing a 16A-QAM signal constellation with a QPSK sub-constellation to generate a locking parameter.
Figure 15:
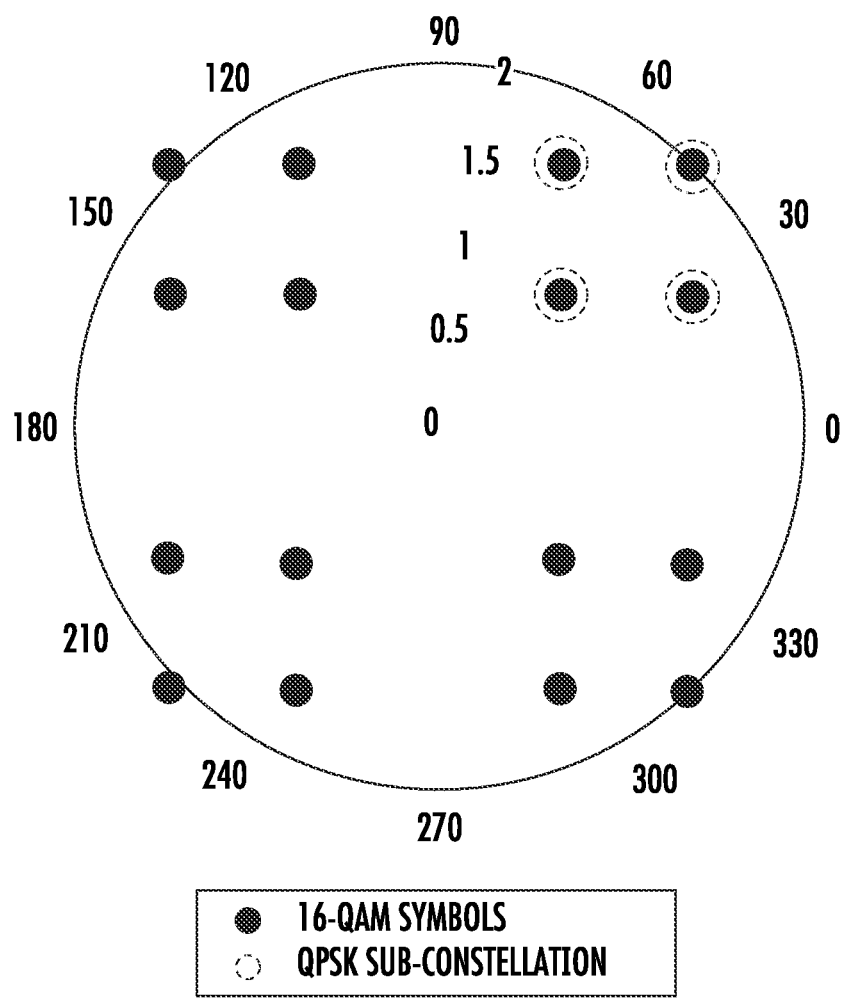
FIG. 15 is a graph showing a 16-QAM signal constellation with an alternate QPSK sub-constellation to generate a locking parameter.
Figure 16:
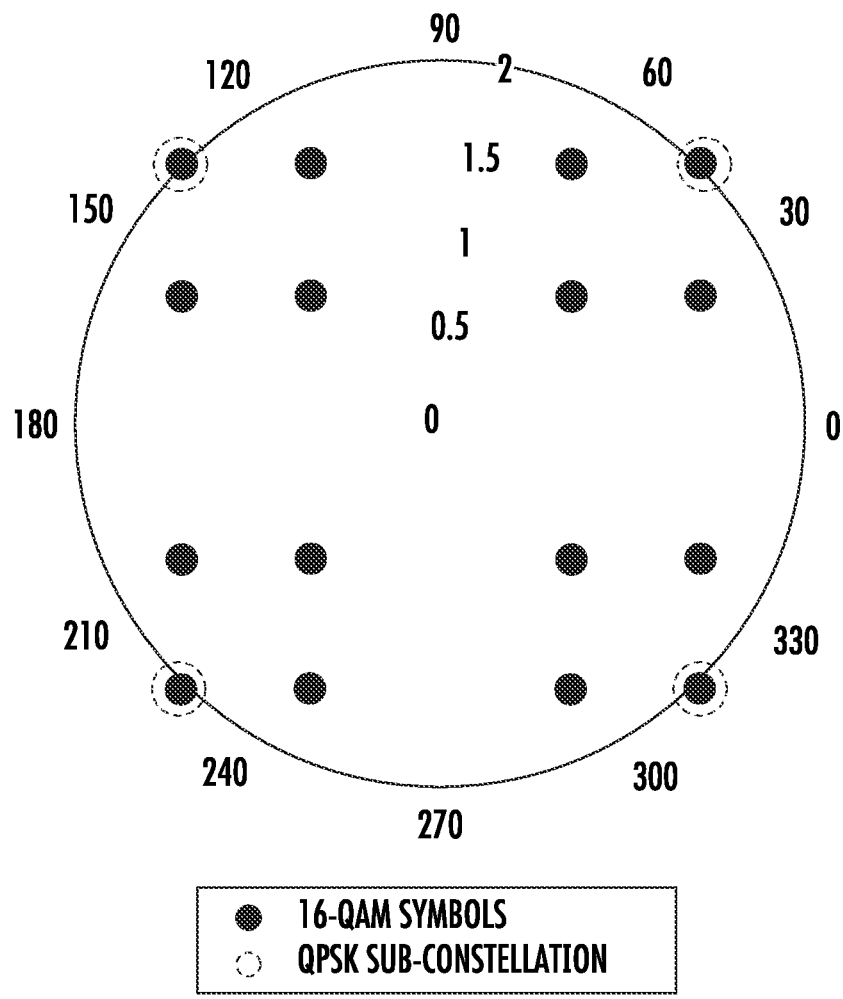
FIG. 16 is a 16-QAM signal constellation with a second alternate QPSK sub-constellation to generate a locking parameter.

However, a 16-QAM signal with a QPSK sub-constellation is shown in the graph of FIG. 14. There is a locking, indicative by the QPSK sub-constellation circles completely encircling the 16-QAM symbols. An alternate QPSK sub-constellation is shown with a 16-QAM signal of FIG. 15 and illustrating how one quadrant of the signal constellation may be between 90° and 0°, and includes the four QPSK sub-constellations. The graph of FIG. 16 shows a second alternate QPSK sub-constellation with the 16-QAM signal.

Figure 17:
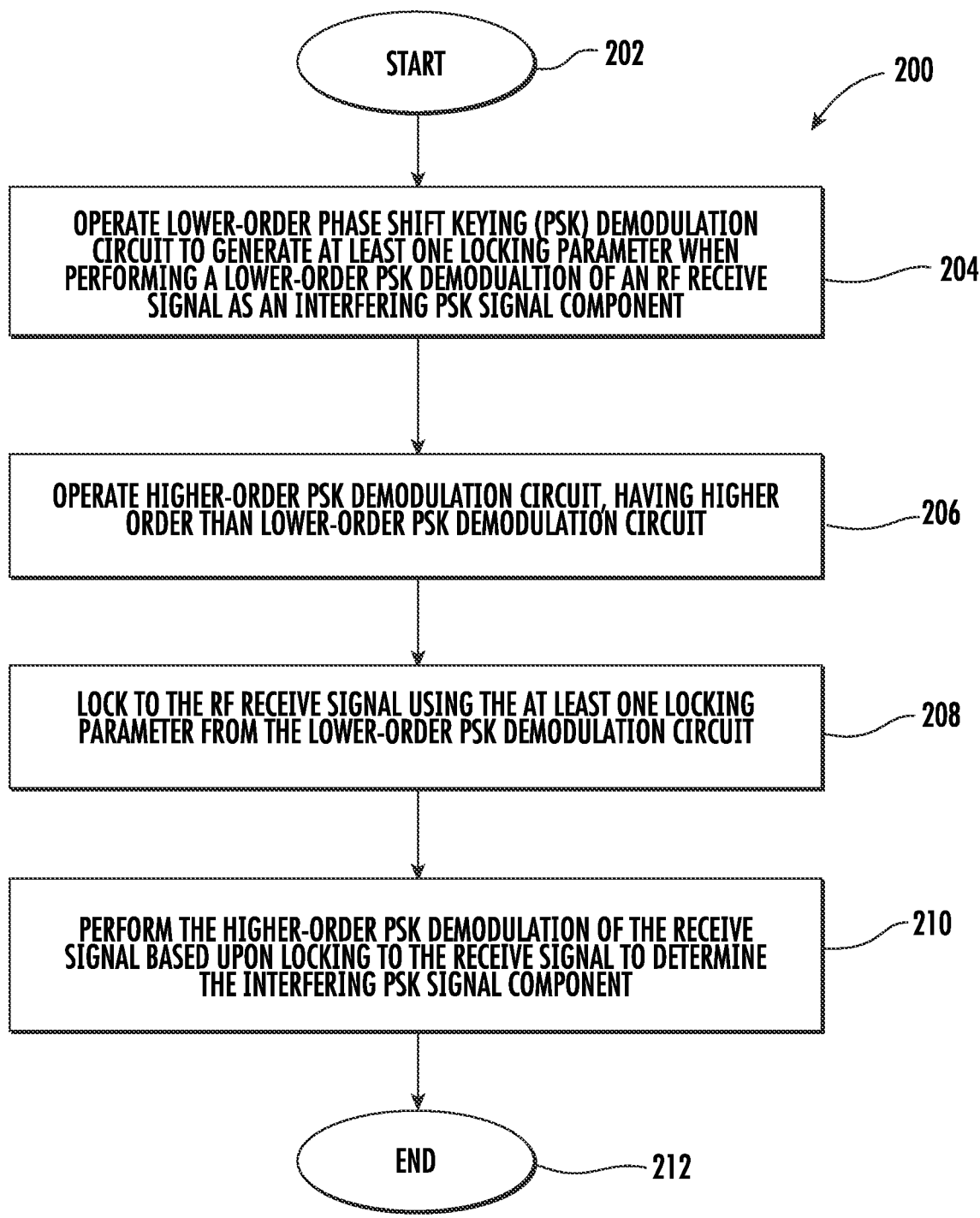
FIG. 17 is a flowchart showing a high-level of a method for radio frequency (RF) reception using the RF receiver of FIG. 1.

Referring now to FIG. 17, there is illustrated a flowchart of a high-level sequence for the method of radio frequency (RF) reception and illustrated generally at 200. The process starts (Block 202) and the lower-order phase shift keying (PSK) demodulation circuit 40 is operated to generate at least one locking parameter when performing a lower-order PSK demodulation of an RF receive signal as an interfering PSK signal component (Block 204). The higher-order PSK demodulator circuit 44 has a higher order than the lower-order PSK demodulation circuit 40 and is operated (Block 206), and the RF receive signal is locked using at least one locking parameter from the lower-order PSK demodulation circuit (Block 208). The higher-order PSK demodulation is performed on the RF receive signal based upon locking to the signal to determine the interfering PSK signal component (Block 210). The process ends (Block 212).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A Radio Frequency (RF) receiver comprising:
a lower-order phase shift keying (PSK) demodulation circuit configured to generate at least one locking parameter when performing a lower-order PSK demodulation of an RF receive signal comprising an interfering PSK signal component; and
a higher-order PSK demodulation circuit, having a higher order than the lower-order PSK demodulation circuit, and configured to
lock to the RF receive signal using the at least one locking parameter from the lower-order PSK demodulation circuit, and
perform the higher-order PSK demodulation of the RF receive signal based upon locking to the RF receive signal to determine the interfering PSK signal component.

2. The RF receiver of claim 1 comprising an interference removal circuit configured to remove the determined interfering PSK signal component from the RF receive signal.

3. The RF receiver of claim 1 wherein the lower-order PSK demodulation circuit comprises a demodulator and a remodulator coupled thereto.

4. The RF receiver of claim 3 wherein the demodulator comprises a first phase shifter, a detector coupled downstream from the first phase shifter, and a phase loop coupled between the detector and first phase shifter.

5. The RF receiver of claim 3 wherein the remodulator comprises a second phase shifter, and a controller coupled thereto.

6. The RF receiver of claim 1 wherein the at least one locking parameter comprises a carrier frequency of the RF receive signal.

7. The RF receiver of claim 1 wherein the at least one locking parameter comprises a symbol rate of the RF receive signal.

8. The RF receiver of claim 1 wherein the lower-order PSK demodulation circuit comprises one of a BPSK and QPSK demodulation circuit.

9. The RF receiver of claim 1 wherein the higher-order PSK demodulation circuit comprises one of an 8 PSK, 16 PSK and 16 QAM demodulation circuit.

10. A Radio Frequency (RF) receiver comprising:
a quadrature phase shift keying (QPSK) demodulation circuit configured to generate at least one locking parameter when performing a QPSK demodulation of an RF receive signal comprising an interfering PSK signal component;
a higher-order PSK demodulation circuit, having a higher order than the QPSK demodulation circuit, and configured to
lock to the RF receive signal using the at least one locking parameter from the QPSK demodulation circuit, and
perform the higher-order PSK demodulation of the RF receive signal based upon locking to the RF receive signal to determine the interfering PSK signal component; and
an interference removal circuit configured to remove the determined interfering PSK signal component from the RF receive signal.

11. The RF receiver of claim 10 wherein the QPSK demodulation circuit comprises a demodulator and a remodulator coupled thereto.

12. The RF receiver of claim 11 wherein the demodulator comprises a first phase shifter, a detector coupled downstream from the first phase shifter, and a phase loop coupled between the detector and first phase shifter.

13. The RF receiver of claim 11 wherein the remodulator comprises a second phase shifter, and a controller coupled thereto.

14. The RF receiver of claim 10 wherein the at least one locking parameter comprises a carrier frequency of the RF receive signal.

15. The RF receiver of claim 10 wherein the at least one locking parameter comprises a symbol rate of the RF receive signal.

16. The RF receiver of claim 10 wherein the higher-order PSK demodulation circuit comprises one of an 8 PSK, 16 PSK and 16 QAM demodulation circuit.

17. A method for Radio Frequency (RF) reception comprising:
operating a lower-order phase shift keying (PSK) demodulation circuit to generate at least one locking parameter when performing a lower-order PSK demodulation of an RF receive signal comprising an interfering PSK signal component; and operating a higher-order PSK demodulation circuit, having a higher order than the lower-order PSK demodulation circuit, to
- lock to the RF receive signal using the at least one locking parameter from the lower-order PSK demodulation circuit, and
- perform the higher-order PSK demodulation of the RF receive signal based upon locking to the RF receive signal to determine the interfering PSK signal component.

18. The method of claim 17 comprising operating an interference removal circuit to remove the determined interfering PSK signal component from the RF receive signal.

19. The method of claim 17 wherein the lower-order PSK demodulation circuit comprises a demodulator and a remodulator coupled thereto.

20. The method of claim 17 wherein the at least one locking parameter comprises a carrier frequency of the RF receive signal.

21. The method of claim 17 wherein the at least one locking parameter comprises a symbol rate of the RF receive signal.

22. The method of claim 17 wherein the lower-order PSK demodulation circuit comprises one of a BPSK and QPSK demodulation circuit.

23. The method of claim 17 wherein the higher-order PSK demodulation circuit comprises one of an 8 PSK, 16 PSK and 16 QAM demodulation circuit.

* * * * *